Sept. 11, 1923.

F. A. OLSON 1,467,492

COMBINED WATER FEED VALVE AND CLEANER

Filed May 19, 1921

INVENTOR.
FRANK A. OLSON.
BY HIS ATTORNEY
James F. Williamson

Patented Sept. 11, 1923.

1,467,492

UNITED STATES PATENT OFFICE.

FRANK A. OLSON, OF REVERE, MINNESOTA.

COMBINED WATER-FEED VALVE AND CLEANER.

Application filed May 19, 1921. Serial No. 470,884.

*To all whom it may concern:*

Be it known that I, FRANK A. OLSON, citizen of the United States, residing at Revere, in the county of Cottonwood and State of Minnesota, have invented certain new and useful Improvements in Combined Water-Feed Valves and Cleaners; and I do hereby declare the following to be a full, clear, and exact description of the invention, such as will enable others skilled in the art to which it appertains to make and use the same.

This invention relates to a valve and particularly to a valve adapted to be used in the feed water pipe of a boiler used in connection with a steam engine or for other purposes. It is well known to those skilled in the art that a feed water pipe often becomes considerably obstructed by the deposit of minerals carried in solution in the water used and it is often difficult and inconvenient to clear away such obstruction.

It is an object of this invention therefore, to provide a valve for a feed water pipe, which valve is provided with means for quickly and easily clearing the pipe of deposited material or sediment.

It is a further object of the invention to provide a valve having such means which is operable by the handle usually provided for operating the valve.

These and other objects of the invention will be clearly set forth in the following description made in connection with the accompanying drawings, in which like reference characters refer to the same parts throughout the different views and in which Fig. 1 is a central longitudinal section of the device;

Figure 1:
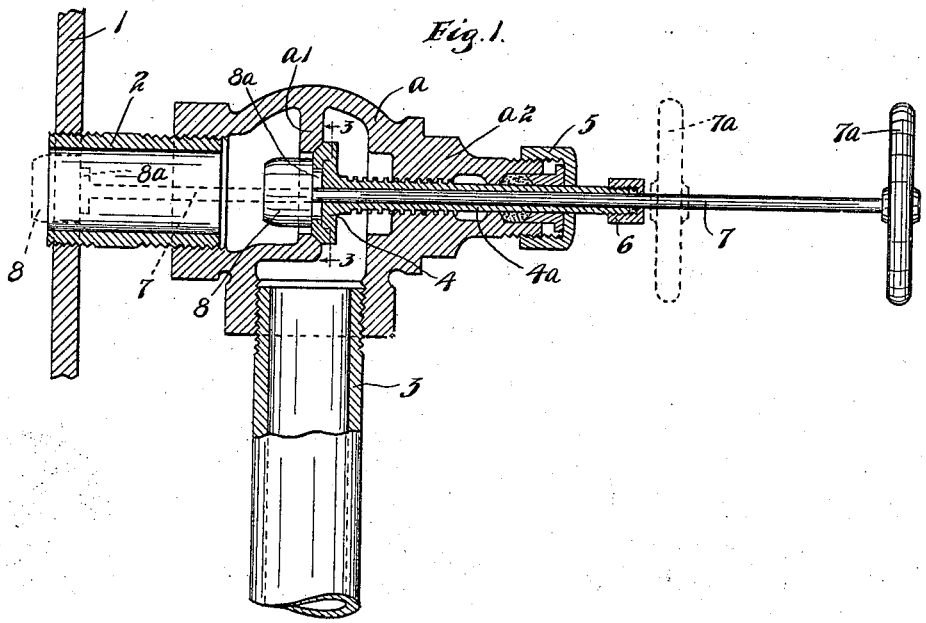
Figure 2:
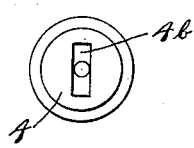
Fig. 2 is an end view of the valve seat used.
Figure 3:
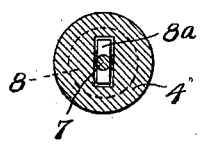
Fig. 3 is a section taken on line 3—3 of Fig. 1.

Referring to the drawings:

The wall or shell 1 of a boiler is shown into which extends and is threaded the feed water pipe 2. This said water pipe is connected to the supply pipe 3 by a valve designated generally as $a$. In the embodiment of the invention illustrated, valve $a$ is shown as of the common globe type having the usual web or diaphragm $a^1$, which is provided with an aperture, one side of which is arranged as a conical valve seat. The valve is provided with an extended sleeve $a^2$, which is bored at its outer end and provided with a threaded inner portion and adapted to receive the closing member or valve 4 formed with a conical edge to co-operate with the seat in web $a^1$. The member 4 is provided with a stem $4^a$ threaded for a portion of its length to co-operate with the threaded portion of sleeve $a^2$ and also adapted to extend through the bored outer portion thereof and through a stuffing box gland and cap 5 threaded onto the outer end of the sleeve $a^2$. The usual packing is held and compressed in sleeve $a^2$ by the stuffing box members. The end of stem $4^a$ is threaded and provided with an apertured cap 6 and suitable packing is disposed between the end of the stem $4^a$ and said cap. The member 4 is provided on its inner end with a slot $4^b$ and is also bored through its length to receive the rod 7, which fits therein and which is provided at its outer end with the operating handle or wheel $7^a$. The rod 7 carries at its inner end a head 8 shown as a cylindrical member with its inner end slightly tapered or rounded. The head 8 is rigidly secured to the stem 7 and is provided on its outer face with a projecting rectangular tongue $8^a$ of such a size as to be easily received in the slot $4^b$. The member 8 may, if desired, be provided with longitudinal extending teeth or corrugations.

The operation of the device is as follows: When it is desired to close the valve member 4, the rod 7 will be reciprocated in the stem $4^a$ to bring the tongue $8^a$ into engagement with the slot $4^b$. The wheel $7^a$ now being turned, the valve 4 will be turned and will move longitudinally in the projection or sleeve $a^2$. The member 4 can thus be moved in either direction to close or open the valve and the communication between pipes 3 and 2. When it is desired to clear the pipe 2 of sediment or deposits, the stem 7 will be reciprocated in sleeve $4^a$ so as to project the head through the said pipe as shown in dotted lines in Fig. 1. The head can be given a rotative motion during the reciprocation if desired and will quickly act to clear the said pipe.

From the above description, it is seen that applicant has provided a very simple and effective means for keeping the feed pipe clean. The additional elements can be added to the usual valve at the small cost and add greatly to the utility of the same.

It will, of course, be understood that various changes may be made in the form, details and arrangement of the device without departing from the scope of applicant's invention, which generally stated consists in the matter shown and described and set forth in the appended claims.

What is claimed is:—

1. A device of the class described having in combination, a pipe and valve secured thereto and comprising a closing member, and an operating device for said member including means adapted to be projected through said pipe to clean the same while the closing member remains stationary.

2. A device of the class described comprising a pair of pipes, a valve connecting the same and provided with a closing member, an operating member for said member comprising means adapted to engage said member and to be moved longitudinally through one of said pipes.

3. A device of the class described comprising a feed water pipe for a boiler and a controlling valve connected thereto having a valve seat and member adapted to be turned and movable toward said seat to close the valve, and means for turning said member including a member adapted to be moved longitudinally through said pipe to clean the same.

4. A device of the class described comprising a feed water pipe, a controlling valve connected thereto, a closing member for said valve adapted to be turned so as to move to a closing position, a stem extending through said member and provided at its outer end with means for turning the same, said stem having at its inner end a member adapted to be engaged or disengaged with said closing member to turn the same and also adapted to be projected through the said pipe to clear the same.

5. A device of the class described having in combination, a feed water pipe and valve connected thereto and having a closing member therein adapted to be turned so as to move to a closing position said closing member having a recess in its inner end, a stem extending through said closing member and provided at its outer end with turning means and at its inner end with a cylindrical head of slightly smaller diameter than said pipe and having means thereon adapted to be received in the recess in said closing member, said stem and head being adapted to be reciprocated to move said head through the said pipe and to bring said head into engagement with the closing member for operating the same.

6. A valve provided with a valve seat, a valve member movable into and out of contact with the same, and means for operating said member including a cleaning device movable relatively to said member.

7. A valve provided with a valve seat and a valve member movable into and out of contact with said seat, and means for moving said member including a member extending at one side of said seat and a cleaning device located at the other side of said seat.

8. The combination with a globe valve having a seat, valve, valve operating stem and hand wheel, of a cleaning device connected to said stem beyond the seat, said stem and device arranged for selective longitudinal or rotative movement.

9. In a device of the class described, a pipe, a valve casing secured thereto provided with a valve seat axially alined with said pipe, a valve for said seat and an operating means for moving said valve including a member of slightly less diameter than the bore of said pipe, and adapted to be progressed therethrough to clean the same, said member being movable relatively to the valve.

In testimony whereof I affix my signature in presence of two witnesses.

FRANK A. OLSON.

Witnesses:
C. E. JOHNSON,
G. S. GORDY.